United States Patent
Zhang et al.

(10) Patent No.: US 12,491,576 B2
(45) Date of Patent: Dec. 9, 2025

(54) EDGE SHAPING USING MATERIAL PROCESSING SYSTEMS

(71) Applicant: Hypertherm, Inc., Hanover, NH (US)

(72) Inventors: Yu Zhang, Hanover, NH (US); Steven Moody, Charlestown, NH (US)

(73) Assignee: Hypertherm, Inc., Hanover, NH (US)

( * ) Notice: Subject to any disclaimer, the term of this patent is extended or adjusted under 35 U.S.C. 154(b) by 704 days.

(21) Appl. No.: 17/894,229

(22) Filed: Aug. 24, 2022

(65) Prior Publication Data

US 2023/0064501 A1    Mar. 2, 2023

Related U.S. Application Data

(60) Provisional application No. 63/237,009, filed on Aug. 25, 2021.

(51) Int. Cl.
*B23K 10/00*    (2006.01)
*B24C 1/04*    (2006.01)

(52) U.S. Cl.
CPC .............. *B23K 10/00* (2013.01); *B24C 1/045* (2013.01)

(58) Field of Classification Search
CPC .. B23K 10/006; B23K 10/00; B23K 37/0235; B24C 1/045
See application file for complete search history.

(56) References Cited

U.S. PATENT DOCUMENTS

| | | |
|---|---|---|
| 3,707,615 A | 12/1972 | Rotolico et al. |
| 3,740,522 A | 6/1973 | Muehlberger |
| 4,076,082 A | 2/1978 | Baum et al. |
| 4,423,304 A | 12/1983 | Bass et al. |
| 4,839,492 A | 6/1989 | Bouchier et al. |

(Continued)

FOREIGN PATENT DOCUMENTS

| | | |
|---|---|---|
| EP | 0304855 A1 | 3/1989 |
| EP | 0480149 A2 | 4/1992 |

(Continued)

OTHER PUBLICATIONS

"Australian Notice of Acceptance for Your Patent Application," Australian Government—IP Australia, Australian Patent Application No. 2022334443, Date of Mailing: May 19, 2025, pp. 1-4.

(Continued)

*Primary Examiner* — Woody A Lee, Jr.
(74) *Attorney, Agent, or Firm* — Cesari and McKenna, LLP

(57) ABSTRACT

A computer-implemented method is provided for shaping an edge of a part to be cut from a workpiece using a material processing system comprising a processing head configured to deliver a processing stream. The method includes calculating a start point and an end point of a shaping path proximate to the edge of the part based on a desired edge profile and determining a set of operating parameters to controllably impinge the processing stream about the edge of the part to execute the shaping path from the start point to the end point. The method further includes positioning the processing head normal to a surface of the part and controllably impinging the processing stream at the edge of the part, by the processing head, to shape the desired edge profile.

14 Claims, 6 Drawing Sheets

(56) References Cited

U.S. PATENT DOCUMENTS

| | | |
|---|---|---|
| 4,877,937 A | 10/1989 | Mülller |
| 4,954,683 A | 9/1990 | Hatch |
| 4,970,364 A | 11/1990 | Mülller |
| 5,132,512 A | 7/1992 | Sanders et al. |
| D338,142 S | 8/1993 | Sarkissian |
| 5,837,959 A | 11/1998 | Muehlberger et al. |
| 6,114,649 A | 9/2000 | Delcea |
| 6,222,154 B1 | 4/2001 | Yamaguchi et al. |
| 6,262,386 B1 | 7/2001 | Fomsel |
| 6,353,200 B2 | 3/2002 | Schwankhart |
| 6,657,152 B2 | 12/2003 | Shimazu |
| 6,744,006 B2 | 6/2004 | Johnson et al. |
| 8,240,046 B2 * | 8/2012 | Peretti .................... F01D 5/288 29/402.09 |
| 8,624,150 B2 | 1/2014 | Simek et al. |
| 8,987,636 B2 | 3/2015 | Fagan |
| 9,107,282 B2 | 8/2015 | Twarog |
| 9,497,845 B2 | 11/2016 | Chen et al. |
| 11,504,794 B2 | 11/2022 | Nadler et al. |
| 12,128,507 B2 * | 10/2024 | Lindsay ............... B23K 10/006 |
| 2003/0168786 A1 | 9/2003 | Pasulka |
| 2004/0140295 A1 | 7/2004 | Herres |
| 2005/0035093 A1 * | 2/2005 | Yamaguchi .......... B23K 10/006 219/121.54 |
| 2005/0035094 A1 * | 2/2005 | Titze .................... B23K 26/302 219/121.64 |
| 2007/0114212 A1 | 5/2007 | Jones et al. |
| 2009/0039059 A1 | 2/2009 | Twarog et al. |
| 2009/0240368 A1 | 9/2009 | Young, Jr. et al. |
| 2010/0242843 A1 * | 9/2010 | Peretti ................. B23K 26/342 118/723 R |
| 2011/0198320 A1 * | 8/2011 | Mather ................. B23K 9/013 219/121.48 |
| 2012/0298632 A1 | 11/2012 | Riemann et al. |
| 2012/0298633 A1 | 11/2012 | Riemann et al. |
| 2013/0193118 A1 | 8/2013 | Severance, Jr. et al. |
| 2014/0138360 A1 | 5/2014 | Hansen et al. |
| 2014/0332504 A1 | 11/2014 | Hamada et al. |
| 2015/0129563 A1 | 5/2015 | Hodges et al. |
| 2016/0106993 A1 | 4/2016 | Watson et al. |
| 2017/0203381 A1 * | 7/2017 | Jogdand ............... H05H 1/3423 |
| 2017/0282279 A1 * | 10/2017 | Currier ................. B23K 10/00 |
| 2018/0044219 A1 | 2/2018 | Marjanovic et al. |
| 2020/0156170 A1 | 5/2020 | Lindsay et al. |
| 2021/0146469 A1 * | 5/2021 | Wang .................... B23K 10/027 |

FOREIGN PATENT DOCUMENTS

| | | | |
|---|---|---|---|
| EP | 0634887 | 1/1995 | |
| EP | 2082824 A1 | 7/2009 | |
| EP | 2621869 A2 | 8/2013 | |
| EP | 2821869 A1 * | 1/2015 | ............. B26F 3/004 |
| EP | 2821869 B1 | 6/2016 | |
| FR | 2672459 | 8/1992 | |
| GB | 845410 A | 8/1960 | |
| JP | H09-47877 A | 2/1997 | |
| JP | 2010-207868 A | 9/2010 | |
| JP | 2015-074026 A | 4/2015 | |
| JP | 5846760 B2 | 1/2016 | |
| JP | 2018-062003 A | 4/2018 | |
| SU | 449788 A | 8/1975 | |
| WO | WO-9408747 A1 | 4/1994 | |
| WO | 2008/044756 A1 | 4/2008 | |
| WO | WO-2018198871 A1 * | 11/2018 | .............. B23K 9/04 |
| WO | 2022037797 A1 | 8/2020 | |

OTHER PUBLICATIONS

"PCT International Search Report for International Application No. PCT/US2013/051989," dated Jan. 23, 2014, pp. 1-4.

"Powermax 125®: Plasma Arc Cutting System," Hypertherm Inc., Hypertherm®, Operator Manual 808080, Revision 3, Sep. 2016, pp. 1-134.

Notification of Transmittal of the International Search Report and the Written Opinion of the International Searching Authority, or the Declaration, International Filing Date: Aug. 24, 2022, International Application No. PCT/US2022/41345 Applicant: Hypertherm, Inc., Date of Mailing: Jan. 9, 2023, pp. 1-21.

"Japanese Notice of Allowance," with English Translation, Japanese Patent Office, Japanese Patent Application No. 2024-512153, Date of Mailing: Aug. 5, 2025, pp. 1-6.

"Supplementary European Search Report and Written Opinion," European Application No. 22862024.1-1103, Applicant: Hypertherm, Inc., Date of Mailing: Sep. 16, 2025, pp. 1-9.

* cited by examiner

EDGE SHAPING USING MATERIAL PROCESSING SYSTEMS

CROSS REFERENCE TO RELATED APPLICATION

This application claims the benefit of and priority to U.S. Provisional Patent Application No. 63/237,009, filed Aug. 25, 2021, the entire content of which is owned by the assignee of the instant application and incorporated herein by reference in its entirety.

TECHNICAL FIELD

The present invention generally relates to systems and methods for shaping an edge of a part to be cut from a workpiece using a material processing system.

BACKGROUND

Material processing systems, including plasma arc torch systems, laser processing systems, and liquid jet processing systems, are widely used for processing (e.g., heating, cutting, gouging and marking) of materials (e.g., conductive materials, such as metals). These material processing systems comprise various consumable components, including a processing head for delivering a processing stream to a workpiece to process the workpiece. For example, a plasma arc torch system generally includes a processing head comprising a plasma arc torch head, an electrode mounted within the torch head, an emitter disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In operation, the plasma arc torch produces a processing stream comprising a plasma arc, which is a constricted jet of an ionized gas with high temperature and sufficient momentum, to assist with removal of molten metal. Gases used in the torch can be non-reactive (e.g., argon or nitrogen), or reactive (e.g., oxygen or air). Other types of material processing systems, such as water jet processing systems or laser processing systems, also include various consumable components that are used to operate their respective processing devices. These consumables include processing heads (e.g., waterjet cutting heads or laser cutting heads) for delivering processing streams (e.g., water jet streams or laser streams) to process workpieces.

These material processing systems are frequently used to cut flat plates, I-Beams and pipes in preparation for welding and assembly into complex machines and structures. Popular welding techniques often require beveled edges (i.e., sloping, non-90 degree edges) on parts to be joined to achieve a strong weld. Traditionally, to achieve a beveled shape on the edge of a part, material processing systems use multi-axis bevel torches and/or a significant amount of secondary work (e.g., grinding by an end user). However, a multi-axis bevel torch is expensive, complex in design and complicated to operate/maneuver about the part to achieve the desired bevel shape. In addition, secondary work used to achieve the desired shape is typically inefficient. These inefficiencies of secondary work and expenses involved in employing complex cutting components limit the usage of traditional material processing systems (e.g., plasma or laser cutting systems) in developing weldable parts. Further, for a part to be painted, a right-angled (i.e., 90 degree) edge on the part is difficult to paint and often serves as a failure/chip point for the paint on the finished product. Thus, edge chamfering (i.e., cutting away a portion of a right-angled edge of a part to achieve a rounded sloping edge) may be required for more easily paintable parts. Currently, operators grind the right-angled edge of a part to achieve a paintable chamfered edge, which again results in inefficiencies and additional material handling requirements as well as additional human manipulation.

Therefore, there is a need for systems and methods capable of achieving bevel and/or chamfer shapes in part edges without necessitating secondary work and/or complex processing components.

SUMMARY

The present invention provides systems and methods for achieving beveled and chamfered edges on a part of a workpiece using existing material processing systems, such as plasma arc systems and laser systems. In some embodiments, a simple X-Y cutting table in conjunction with controlled adjustment of processing head motion, operation and/or process settings are used to obtain consistent bevel cuts and/or chamfer cuts, without any usage of complex cutting components (e.g., articulated or bevel bench, robotic manipulation, etc.) or secondary work.

In one aspect, the present invention features a computer-implemented method for shaping an edge of a part to be cut from a workpiece using a material processing system comprising a processing head configured to deliver a processing stream. The method includes calculating, by the material processing system, a start point and an end point of a shaping path proximate to the edge of the part based on a desired edge profile and calculating, by the material processing system, a start point and an end point of a shaping path proximate to the edge of the part based on a desired edge profile. The method also includes determining, by the material processing system, a set of operating parameters to controllably impinge the processing stream about the edge of the part to execute the shaping path from the start point to the end point. The set of operating parameters includes at least one of a height of the processing head relative to the part, an energy density of the processing stream, a speed of the processing head along the shaping path, an offset of the shaping path relative to the edge of the part, and a pressure of the processing stream. The method further includes positioning, by the material processing system, the processing head normal to a surface of the part and controllably impinging the processing stream at the edge of the part, by the processing head, to shape the desired edge profile.

In another aspect, a material processing system is provided for shaping an edge of a part to be cut from a workpiece. The material processing system includes means for generating a processing stream and delivering the processing stream to the workpiece and means for calculating a start point and an end point of a shaping path proximate to the edge of the part based on a desired edge profile. The material processing system also includes means for determining a set of operating parameters to controllably impinge the processing stream about the edge of the part to execute the shaping path from the start point to the end point. The set of operating parameters includes at least one of a height of the processing head relative to the part, an energy density of the processing stream, a speed of the processing head along the shaping path, an offset of the shaping path relative to the edge of the part and a pressure of the processing stream. The material processing system further includes means for positioning the means for delivering the processing stream such that the means for delivering the processing stream is normal to a surface of the part and means for controllably impinging the processing stream at the edge of the part to shape the desired edge profile.

In some embodiments, the material processing system comprises one of a plasma arc torch system, a laser processing system or a waterjet stream. In some embodiments, the processing stream comprises one of a plasma arc, a laser beam or a waterjet stream. In some embodiments, the processing stream comprises a laser beam and the controllably impinging comprises delivering the laser beam against the surface of the workpiece to selectively melt a portion of the edge of the part to achieve the desired edge profile.

In some embodiments, the processing stream comprises a plasma arc and the controllably impinging comprises controllably bending the plasma arc at the edge of the part to achieve the desired edge profile. In some embodiments, the controllably bending of the plasma arc comprises bending a distal tip of the plasma arc in a direction non-normal to a direction of travel of the processing head across the workpiece. In some embodiments, the distal tip of the plasma arc comprises about 40% of a length of the plasma arc. In some embodiments, the height of the processing head relative to the part for shaping the edge of the part is set to enable generation of a plasma arc density of about 25% of an energy density associated with a plasma arc usable for cutting/severing the part. In some embodiments, the processing head is laterally offset from the edge of the part of the workpiece by at least about 10% of a width of the plasma arc. In some embodiments, the shaping path is located within about 1 inch from the edge of the part of the workpiece.

In some embodiments, the shaping path comprises a first pass between the start point and the end point and a second pass between the start point and the end point. During the first pass the processing stream pierces the workpiece to detach at least a portion of the part from the workpiece and during the second pass the processing stream shapes the edge of the detached part to achieve the desired edge profile. In some embodiments, at least one of the processing head height, processing stream energy density, processing stream pressure, processing stream gas mixture, speed or offset is different between the first pass and the second pass to achieve the desired edge profile. In some embodiments, the height of the processing head relative to the part during the first pass is less than the height of the processing head relative to the part during the second pass, thereby decreasing the energy density of the processing stream impinging on the workpiece during the second pass. In some embodiments, a desired angle and depth associated with the desired edge profile is produced by controlling a speed of the processing head during the second pass. In some embodiments, a set of cutting consumables is installed to perform the first pass and a different set of consumables is installed to perform the second pass. Alternatively, the same set of consumables is employed for both the first and second passes, but one or more of the operating parameters (e.g., current, power density, pressure, offset and/or processing head height) are varied between the first and second passes to controllably shape the edge of the part.

In some embodiments, determining the set of operating parameters is based on at least one of a material type or a thickness of the workpiece. In some embodiments, the desired edge profile comprises one of a beveled edge (e.g., Y-Bevel, V-bevel, U-bevel, etc.), a scooped/rounded edge or a chamfered edge.

In yet another aspect, a computer-implemented method is provided for shaping an edge of a part to be cut from a workpiece using a laser cutting system comprising a thermal processing head configured to deliver a laser beam. The method includes calculating, by the laser cutting system, a start point and an end point of a shaping path proximate to the edge of the part based on a desired bevel profile and determining, by the laser cutting system, at least a height of the thermal processing head relative to the part for executing the shaping path from the start point to the end point. The method further includes positioning, by the laser cutting system, the processing head normal to a surface of the part at the determined height and selectively melting, by the laser beam delivered from the thermal processing head along the shaping path, a portion of the edge of the part to achieve the desired bevel profile. In some embodiment, one or more operating parameters associated with the laser cutting system are varied to achieve the desired bevel profile, including at least one of a laser power density, work flow pressure, thermal processing head height or lateral offset of the thermal processing head.

In some embodiments, a distal tip of the laser beam penetrates the workpiece in a direction normal to the surface of the workpiece. In some embodiments, the height of the thermal processing head relative to the part is about 1 inch. In some embodiments, determining the height of the thermal process head relative to the part is based on at least one of a material type or a thickness of the workpiece. In some embodiments, the thermal processing head is laterally offset from the edge of the part of the workpiece by at least between about 0.01 inch and about 0.5 inch, such as 0.05 inch.

In some embodiments, the shaping path comprises a first pass between the start point and the end point and a second pass between the start point and the end point. During the first pass the processing stream pierces the workpiece to detach at least a portion of the part from the workpiece and during the second pass the processing stream shapes the edge of the detached part to achieve the desired bevel profile.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
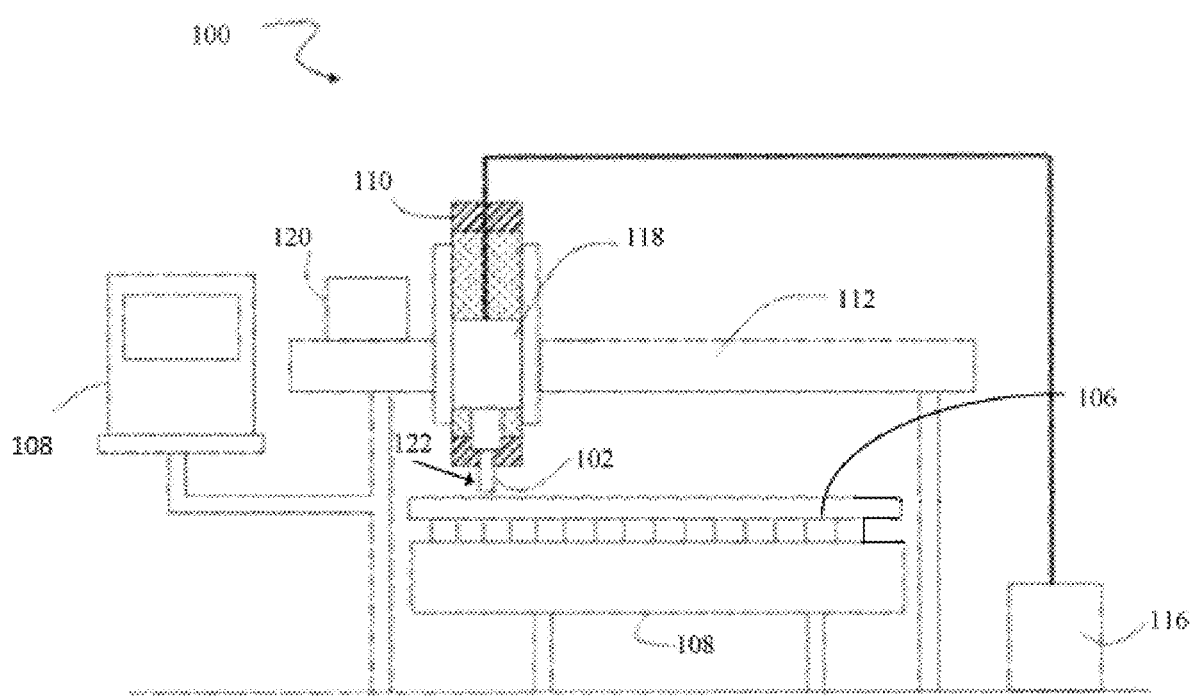
FIG. 1 shows an exemplary material processing system for shaping an edge of a part to be cut from a workpiece, according to some embodiments of the present invention.

FIG. 1 shows an exemplary material processing system 100 for shaping an edge of a part to be cut from a workpiece 106, according to some embodiments of the present invention. As shown, the system 100 generally includes a processing head 102 in electrical communication with a processor 108, which can be a digital signal processor (DSP), microprocessor, microcontroller, computer, computer numeric controller (CNC) machine tool, programmable logic controller (PLC), application-specific integrated circuit (ASIC), or the like. The processing head 102 is configured to generate and deliver a processing stream to the workpiece 106 to (i) cut the part from the workpiece 106 and/or (ii) shape an edge of the part after it is detached from the workpiece 106. In some embodiments, the material processing system 100 is a plasma arc torch system, in which case the processing head 102 is a plasma torch head configured to generate and deliver a plasma arc to the workpiece 106 to perform the cutting and/or edge shaping. In some embodiments, the material processing system 100 is a laser processing system, in which case the processing head 102 is a thermal processing head configured to generate and deliver a laser stream to the workpiece 106 to perform the cutting and/or edge shaping. In some embodiments, the material processing system is a liquid jet system, in which case the processing head 102 is a liquid jet head configured to generate and deliver a stream of liquid to the workpiece 106 to perform the cutting and/or edge shaping.

In an exemplary arrangement of the material processing system 100 as shown in FIG. 1, the workpiece 106 is placed on a cutting table 108 (e.g., a X-Y cutting table), and the processing head 102 is mounted into a height controller 110, which is attached to a gantry 112 such that a distal tip 122 of the processing head 102 is positioned above the workpiece 106. The processor 108 is configured to interact with various system modules of the material processing system 100 to control the motion of the processing head 102 relative the workpiece 106 while directing the processing stream from the processing head 102 along a shaping path on the workpiece 106. The system 100 also includes a power supply 116 configured to interact with various system modules to control the current, voltage and/or power supplied to the processing head 102 for processing the workpiece 106. In some embodiments, the processor 108 and the power supply 116 are integrated into one component. Alternatively, they are separate components as illustrated in FIG. 1.

In general, the processor 108 and/or the power supply 116 are configured to control and optimize the operation of the processing head 102 relative to the workpiece 106 by regulating many system functions that include, but are not limited to, start sequence, CNC interface functions, gas and operating parameters, and shut off sequences. For example, the processor 108 and/or the power supply 116 control various system modules including (i) a gas controller 118 for controlling one or more gases (e.g., shield and/or plasma gases for a plasma arc torch system) supplied to the processing head 102, (ii) a driver system 120 for adjusting the lateral movement of the processing head 102 in relation to the surface of the workpiece 106, (iii) the height controller 110 for adjusting the vertical height between the processing head 102 and the workpiece 106 and (iv) nesting software (not shown) for providing a suitable program that sets desired parameters for processing the workpiece 106 to achieve desired cutting and/or shaping results.

Figure 2:
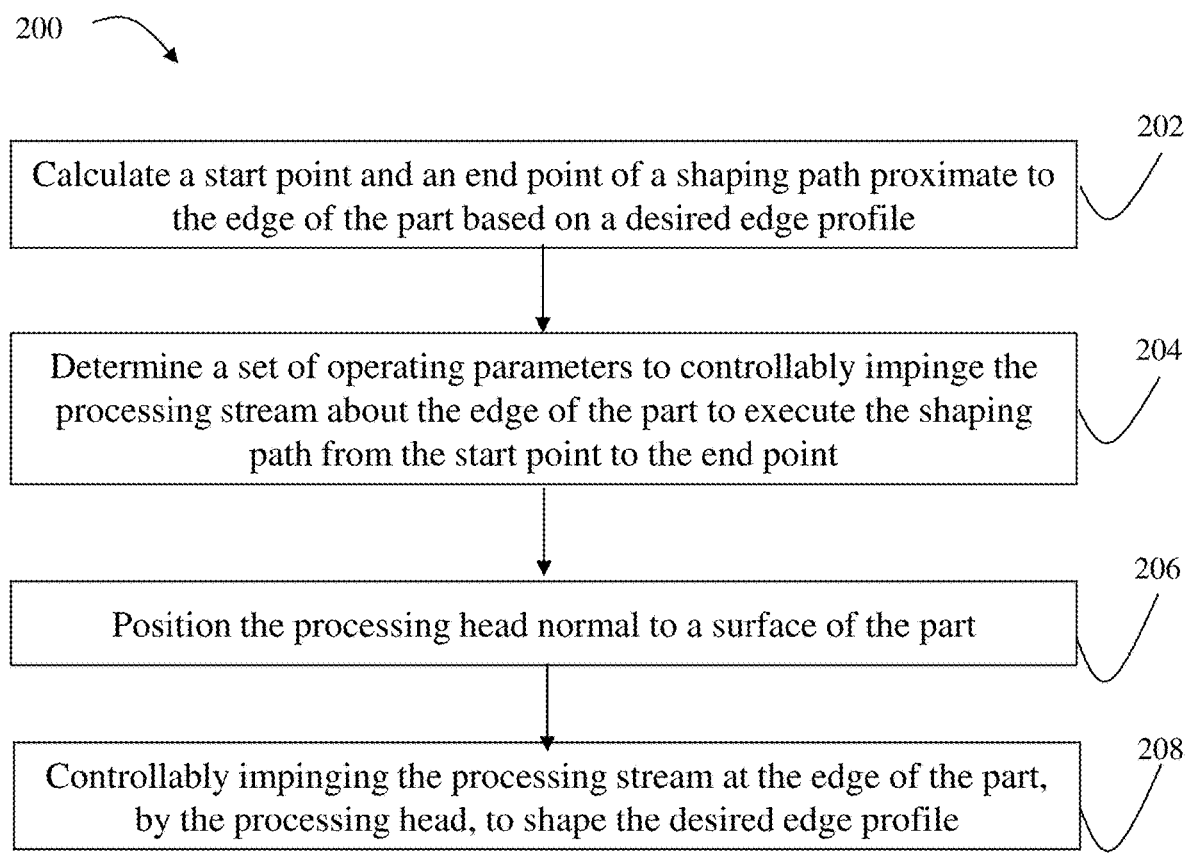
FIG. 2 shows an exemplary computerized process for shaping an edge of the part to be cut from the workpiece using the material processing system of FIG. 1, according to some embodiments of the invention.

FIG. 2 shows an exemplary computerized process 200 for shaping an edge of a part to be cut from a workpiece 106 using the material processing system 100 of FIG. 1, according to some embodiments of the invention. The material processing system 100 can shape an edge of the part cut from the workpiece 106 to achieve a user desired profile at the edge of the part, such as a beveled edge profile, a scooped/rounded edge profile or a chamfered edge profile. As an example, a material processing system 100 can apply the process 200 to a workpiece 106 that is a plate of steel about ⅜ inch thick to cut and/or shape a part from the workpiece 106 with a beveled edge of about 60 degrees.

As shown in FIG. 2, the process 200 starts at step 202 with the material processing system 100 (e.g., the processor 108 and/or the power supply 116 of the material processing system 100) calculating a start point and an end point of a shaping path proximate to the edge of the part to achieve a desired edge profile. In some embodiments, the shaping path includes two or more passes, with each pass extending between the start point and the end point. During the first pass, the processing head 102 delivers a processing stream to pierce the workpiece 106 to detach at least a portion of the part from the workpiece 106 (e.g., cut away the part from the workpiece). After the first pass, the edge of the part at which the cut was made may be substantially right angled (i.e., 90 degrees). During the second and any subsequent passes, the processing stream shapes the edge of the part at which the initial cut was made such that the desired edge profile is achieved. Thus, the edge at which the part is cut/detached from the workpiece 106 from the first pass can be the same as the edge at which shaping is performed during the second pass and any subsequent pass. In alternative embodiments, the part is provided without any additional cutting required, in which the case the shaping path is a single-pass operation where the start point and the end point of the shaping path indicate the edge at which shaping to the desired profile is needed.

At step 204, the material processing system 100 (e.g., the processor 108 and/or the power supply 116 of the material processing system 100) determines a set of one or more operating parameters to produce and controllably impinge the processing stream (by the processing head 102) about the edge of the part to execute the shaping path from the start point to the end point, either in a multi-pass (e.g., two-pass) shaping path or a single-pass shaping path. The set of operating parameters can include at least one of the height of the processing head 102 above the surface of the workpiece 106 (e.g., by adjusting the height controller 110), an energy density of the processing stream generated by the processing head 102, a speed of the processing head 102 along the shaping path, and a lateral offset of the shaping path relative to the edge of the part (e.g., about 0.01 inch to about 1 inch depending on the shape thickness and angle). In some embodiments, the set of parameters is determined based on at least one of a material type or a thickness of the workpiece while taking into consideration the desired edge profile that needs to be achieved. For example, in a plasma arc processing approach, during the second or any subsequent pass (or in a single-pass shaping operation), the operating parameter(s) of a plasma arc torch system 100 can be configured to controllably bend a low-density plasma arc (e.g., a plasma arc with an energy density substantially lower than that of a plasma arc used to cut/sever the workpiece) emitted by the torch head 102 such that the bent arc removes the most material on/from the top portion of the part, thereby achieving a beveled, chamfered or scooped edge profile. For example, a low-density plasma arc can have an energy density of about 25% of the energy density associated with a plasma arc used to cut a workpiece. As another example, in a laser processing approach, during the second or any subsequent pass (or in a single-pass shaping operation), the operating parameter(s) of a laser processing system 100 are configured to generate a laser beam that selectively melts a top portion of the edge of the part, thereby achieving a beveled, chamfered or scooped edge profile. In some embodiments, the first pass and the following pass(es) use the same set of consumables but with different settings of one or more parameters, including cut height, speed, lateral offset, input power density, gas pressure, gas mixture, controlled power profile and pressure profile, etc.

In some embodiments, in a multi-pass (e.g., two-pass) shaping path, one or more of these operating parameters are different between the first pass and the second pass for executing different functions during the passes. More specifically, for the first pass the operating parameter(s) are configured to sever the part from the workpiece 106, thereby dimensionally forming the edge of the part (e.g., as a right-angled edge), and for the second (and any subsequent) pass the operating parameter(s) are configured to shape the same edge of the part from the first pass (e.g., the right-angled edge from the first pass) to achieve the desired profile. In some embodiments, in a two-pass operation, the height of the processing head 102 relative to the part during the first pass is less than the height of the processing head 102 relative to the part during the second pass (e.g., the processing head is spaced farther away from the part during the second pass), thereby decreasing the energy density of the processing stream impingement during the second pass. In some embodiments, in a multi-pass (e.g., two-pass) operation, the speed of the processing head 102 is different among the multiple passes to produce a desired angle and depth associated with the desired edge profile. For example, the speed of the processing head 102 can be faster or slower in the second pass than that of the first pass. Other differences include one or more of different gas pressures, different amperages of current, different lateral offsets of the processing stream center point from the edge, etc. For example, the second pass can introduce a lateral offset at which the processing stream impinges on the part in comparison to the location of impingement of the processing stream in the first pass. In some embodiments, the lateral offset is no larger than twice the diameter of the process gas (e.g. for plasma processing at about 100 A, the lateral offset can be less than about 0.2 inch). In some embodiments, during the second pass at least one of lower current amperage, power density, gas mixture or gas pressure is set in comparison to those set during the first pass. In some embodiments, the height difference and other parameter setting differences among the different passes depend on the cut thickness and bevel angle. For example, for ½ inch mild steel with about 30 degree bevel, the first-pass parameters include current of about 105 A, speed of about 61 inch per minute, cut height of about 0.125 inch and no lateral offset. The second-pass parameters include a current of about 105 A, speed of about 24 inch per minute, cut height of about 1.2 inch, and lateral offset of about 0.15 inch.

At step 206, the material processing system 100 (via the driver system 120 and the gantry 118) positions the processing head 102 substantially normal to the surface of the workpiece 106. At step 208, the material processing system 100 controllably delivers a processing stream (via the processing head 102) to the edge of the part. The processing stream can be delivered by the material processing system 100 in either a multi-pass (e.g., two-pass) shaping path or a single-pass shaping path from the start point to the end point as described above. The material processing system 100 can generate the processing streams for the multi-pass shaping path or the single-pass shaping path using operation parameter(s) determined for the respective pass(es) to achieve the desired edge profile. In some embodiments, if a two-pass operation is used, the material processing system 100 is adapted to use a set of cutting consumables for performing the cutting operation of the first pass before changing these consumables to a different set of consumables (e.g., gouging or beveling consumables) for performing the edge refinement/shaping operation of the second pass. In alternative embodiments, the same set of consumables is used for all passes, but with different operating parameter settings.

Figure 3A:
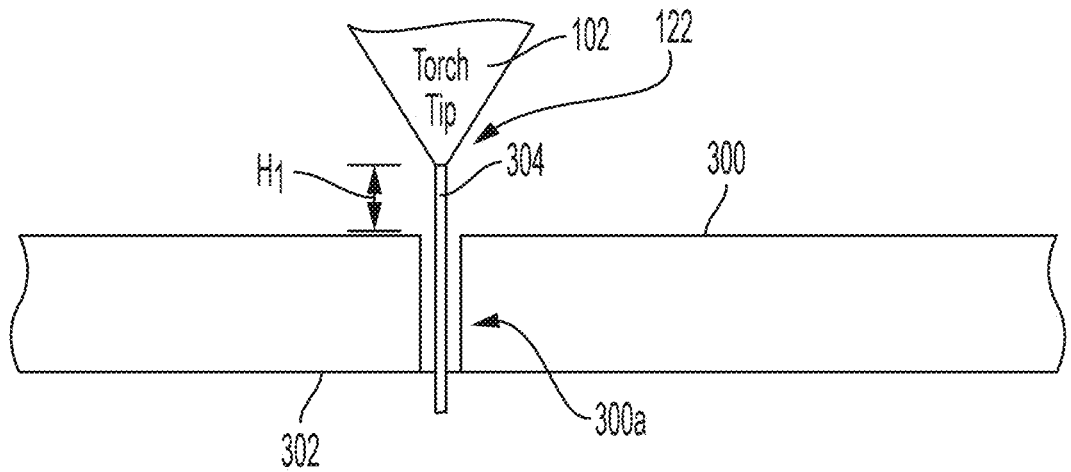
FIGS. 3a and 3b show diagrams visualizing cutting and shaping of a part from a workpiece by a plasma arc torch system in a first pass and a second pass, respectively, using the process of FIG. 2 to produce a chamfered edge, according to some embodiments of the present invention.
Figure 3B:
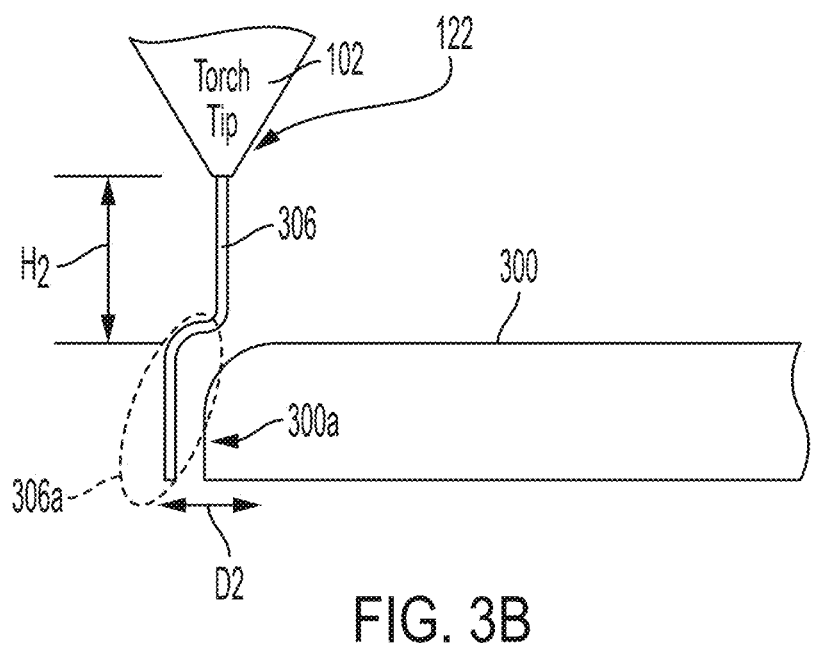

FIGS. 3a and 3b show diagrams visualizing cutting and shaping of a part 300 from a workpiece 302 by a plasma arc torch system 100 in a first pass and a second pass, respectively, using the process 200 of FIG. 2 to produce a chamfered edge, according to some embodiments of the present invention. More specifically, FIG. 3a shows using a plasma arc torch 102 to deliver a plasma arc 304 to the workpiece 302 for cutting (i.e., detaching) the part 300 from the workpiece 302 during a first/initial pass of the shaping path. In some embodiments, the plasma arc 304 impinges substantially normal against the surface of the workpiece 302 during the first pass. In some embodiments, an initial edge 300a is formed on the part 300 after the first pass where the cut is made. The edge 300a can be substantially right-angled, for example. To perform this first-pass cut, the distal tip 122 of the torch 102 is positioned at a first height (H1) from the surface of the workpiece 302, such as about 0.06 inch to about 0.25 inch above the workpiece 302. The operating parameters associated with generating the plasma arc 304, including the first height H1, can be selected such that the plasma arc 304 flows straight down from the plasma arc torch 102 and penetrates through the workpiece 302 at a substantially perpendicular/normal orientation relative to the surface of the workpiece 302. During the first pass as illustrated in FIG. 3a, the center of the plasma arc 304 as it impinges on the surface of the workpiece is substantially aligned (i.e., no lateral offset) from the edge 300a of the part 300.

FIG. 3b shows using the plasma arc torch 102 to deliver a plasma arc 306 to the part 300 from FIG. 3a for shaping the edge 302a of the part 300 during a second pass of the shaping path, where the first and second passes have substantially the same start and end points. As shown, the second pass of the plasma arc torch 102 shapes the edge 300a of the part 300 to form a chamfered edge. To accomplish this, the plasma arc system 100 positions the torch tip 102 at a second height (H2) above the surface of the part 300, where the second height H2 is greater than the first height H1 used in the first pass. In some embodiments, the center of the plasma arc 306 as it impinges on the surface of the part 300 is laterally offset relative to the edge 300a by a lateral offset distance D2. Such height H2 and lateral offset D2 selections, and optionally combined with specific selection of values for the other operating parameters for producing the plasma arc 306, result in a longer and more pliable/flexible plasma arc 306 in comparison to the plasma arc 304 from the first pass. For example, the plasma arc system 100 can select a higher or slower speed at which the torch tip 102 moves across the part 300 in comparison to the torch speed associated with the first pass of FIG. 3a. This varied torch speed relative to that of the first pass is adapted to reduce the amount of material removed from the edge 300a by the plasma arc 306 to achieve the chamfered edge.

The resulting plasma arc 306 can bend upon impinging on the part 300, curves about the material, and into the void/path of least resistance to produce the smooth chamfered shape at the edge 300a of the part 300. As shown, the distal tip 306a of the plasma arc 306 generally bends in a direction non-normal to the direction of travel of the torch 102 across the part 300. In some embodiments, the plasma gas being emitted from the plasma torch 102 pushes the plasma arc 306 to the edge of and about the part 300 as it flows off and away from the part 300, thereby effectively driving the bend of the plasma arc 306 to shape the edge profile. In some embodiments, the distal tip 306a of the plasma arc 306 comprises about 40% of the length of the plasma arc 306. In some embodiments, the resulting chamfered edge 300a of the part 300 provides a ready-to-paint rounded edge.

Figure 4:
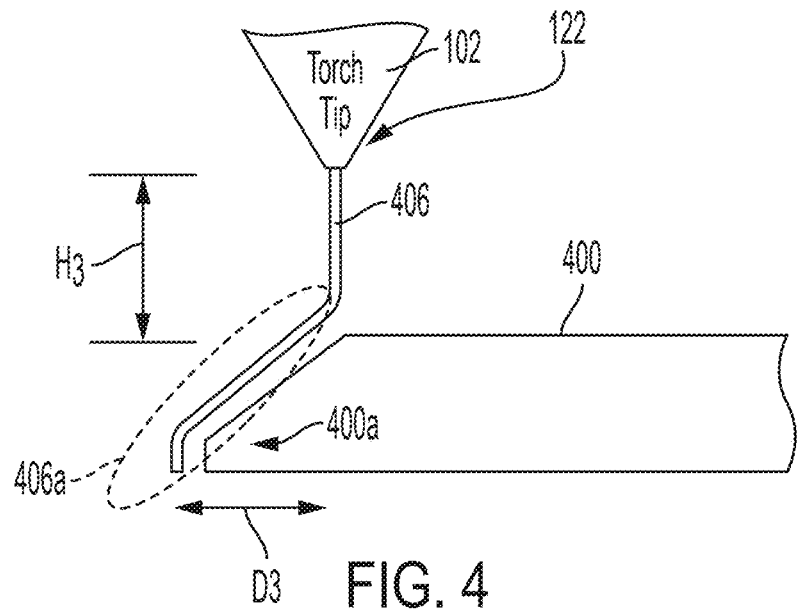
FIG. 4 shows a diagram visualizing shaping an edge of a part by a plasma arc torch system using the process 200 of FIG. 2 to produce a beveled edge, according to some embodiments of the present invention.

FIG. 4 shows a diagram visualizing shaping an edge 400a of a part 400 by a plasma arc torch system 100 using the process 200 of FIG. 2 to produce a beveled edge, according to some embodiments of the present invention. In some embodiments, the shaping process illustrated in FIG. 4 is a stand-alone shaping operation. In some embodiments, the shaping process illustrated in FIG. 4 represents the second pass of a two-pass operation, where the first pass comprises initially cutting the part 400 from a larger workpiece, similar to the first-pass operation explained above with reference to FIG. 3a. In general, to accomplish the beveled shape at the edge 400a, for the second pass the plasma arc system 100 positions the torch tip 102 at a third height (H3) above the surface of the part 400, where the third height H3 can be greater than the first height H1 used in the first pass that cuts the part 400 from the workpiece. In some embodiments, the center of the plasma arc 406 delivered by the torch 102 as it impinges on the surface of the part 400 is laterally offset relative to the edge 400a by a lateral offset distance D3. Such height H3 and lateral offset D3 selections, and optionally combined with selection of values for other operating parameters for producing the plasma arc 406, drive the plasma arc 406 down and off the edge 400a of the part 400 after penetrating the part 400, thereby eroding the top portion of the part 400 and forming an angled/beveled surface at the edge 400a as the torch 400 moves from the start point to the end point of the shaping path. As shown in FIG. 4, to produce the beveled shape, the distal tip 406a of the plasma arc 406 generally bends in a direction non-normal to the direction of travel of the torch 102 across the part 400. In some embodiments, the distal tip 406a of the plasma arc 406 comprises about 40% of the length of the plasma arc 406.

In some embodiments, the angle of the bevel shape can be controlled by adjusting the lateral offset distance D3, the torch height H3, and/or one or more other operating parameters (e.g., torch speed, arc current, etc.). As an example, the torch speed can be increased to increase (i.e., flatten) the bevel angle by reducing the amount of material removed by the arc 406 to produce a shallower bevel depth and thus angle.

In general, for edge shaping using a plasma arc system 100, any one of the height of the plasma arc torch relative to the part (e.g., H2 and H3 of FIGS. 3b and 4, respectively), the lateral offset from the edge of the part (e.g., D2 and D3 of FIGS. 3b and 4, respectively) or values of one or more other operating parameters can be adjusted to achieve the desired edge profile. In some embodiments of a shaping operation after the part is already cut, the height of the plasma arc torch relative to the part (e.g., H2 or H3) is set to enable generation of a plasma arc density of about 25% of the energy density associated with a plasma arc for cutting/severing the same workpiece (e.g., the energy density of the plasma arc used during the first cutting pass). In some embodiments, the lateral offset (e.g., D2 or D3) can be located within about 1 inch from the edge of the part. In some embodiments, the plasma arc is laterally offset from the edge of the part by at least about 10% of a width of the plasma arc. In some embodiments, to develop a rounder edge for a chamfered profile in comparison to a beveled profile (e.g., less material removed in a chamfered profile), the process parameters are adjusted to produce a lower current process and a higher cut speed to reduce the amount of material removed.

Figure 5:
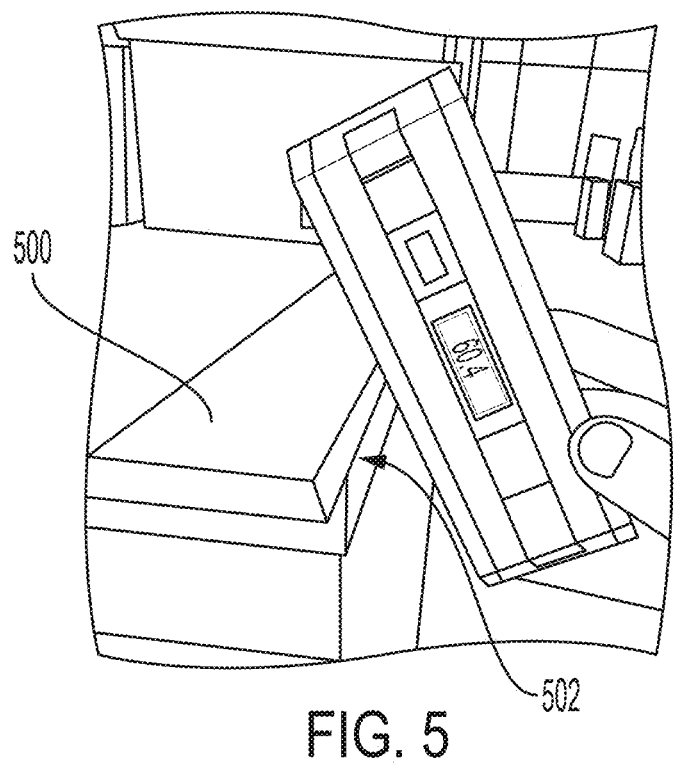
FIG. 5 shows an exemplary part shaped using the process of FIG. 2 to produce a beveled edge, according to some embodiments of the present invention.

FIG. 5 shows an exemplary part 500 shaped using the process 200 of FIG. 2 to produce a beveled edge 502, according to some embodiments of the present invention. The part 500 comprises a plate of steel that is about ⅜ inch thick. The beveled angle is about 60 degrees at the edge 502 of the part 500. In some embodiments, to produce the beveled edge 502 utilizing a plasma arc torch system 100, the part 500 is first cut from a larger workpiece using the first-pass operation described above in detail with reference to FIG. 3a. The edge 502 of the part 500 is then refined to have the beveled profile using the second pass operation described above in detail with reference to FIG. 4.

Figure 6:
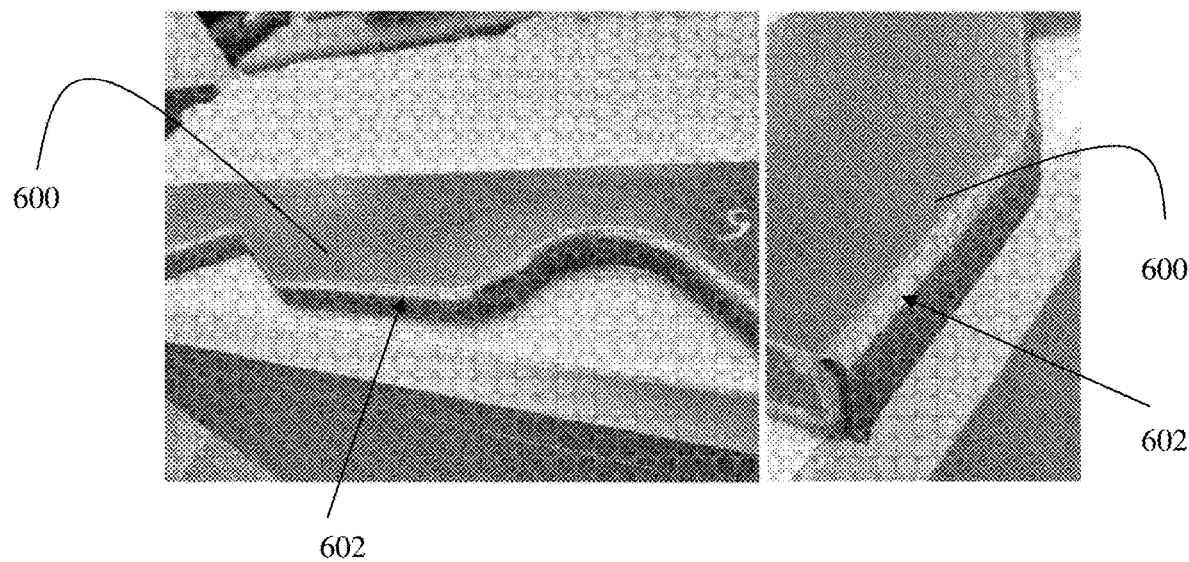
FIG. 6 shows an exemplary part shaped using the process of FIG. 2 to produce a chamfered edge, according to some embodiments of the present invention.

FIG. 6 shows an exemplary part 600 shaped using the process 200 of FIG. 2 to produce a chamfered edge 602, according to some embodiments of the present invention. The part 600 comprises a plate of steel that is about ⅜ inch thick. In some embodiments, to produce the chamfered edge 602 utilizing a plasma arc torch system 100, the part 600 is first cut from a larger workpiece using the first-pass operation described above in detail with reference to FIG. 3a. The edge 602 of the part is then refined to have the chamfered profile using the second pass operation described above in detail with reference to FIG. 3b.

Figure 7:
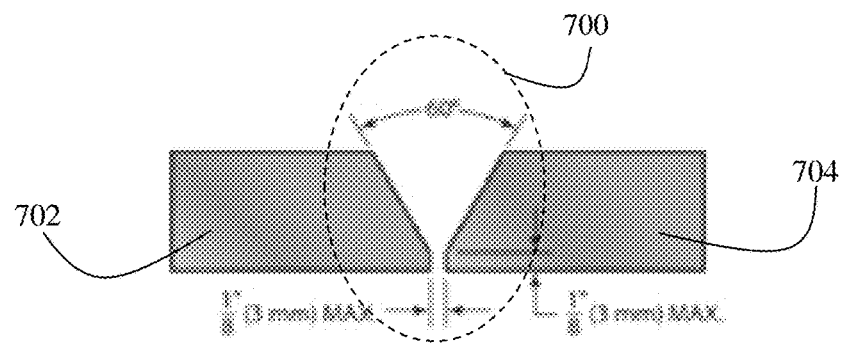
FIG. 7 shows an exemplary V-bevel profile processed by a plasma arc torch system on a workpiece, according to some embodiments of the present invention.
Figure 8:
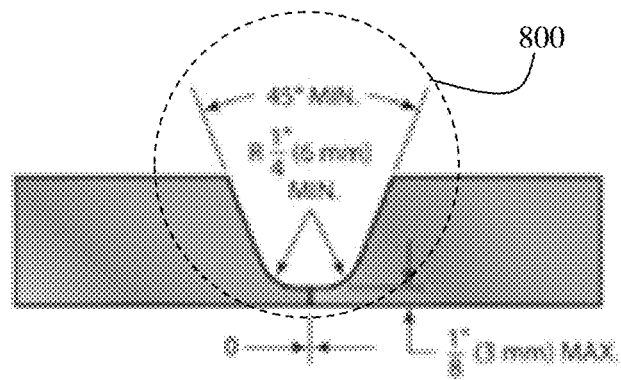
FIG. 8 shows an exemplary U-bevel profile processed by a plasma arc torch system on a workpiece, according to some embodiments of the present invention.

In some embodiments, the process 200 described above for producing a beveled edge profile on a part can be easily adapted to produce other related bevel shapes, such as a V-bevel or a U-bevel. FIG. 7 shows an exemplary V-bevel profile 700 processed by a plasma arc torch system 100 on a workpiece, according to some embodiments of the present invention. This profile 700 can be achieved by repeatedly applying the multi-pass process 200 explained above with reference to FIG. 3a (first pass operation) and FIG. 4 (second pass operation) on two parts 702, 704, where a mirror-imaged bevel cut is generated on the edge of each of the parts 702, 704. FIG. 8 shows an exemplary U-bevel profile 800 processed by a plasma arc torch system 100 on a workpiece, according to some embodiments of the present invention. For the U-bevel 800 of FIG. 8, which is a ⅜-inch U-bevel, the bending of the plasma arc is less than the V-bevel 700 of FIG. 7. In some embodiments, to produce the U-bevel profile 800, the values of one or more operating parameters are set between those associated with a cut and those associated with a bevel. For example, the torch tip height can be selected to be between a height associated with a cut and a height associated with a bevel so that the bending of the resulting plasma arc is also in between. In some embodiments, the operating parameters for the ⅜-in U-bevel include a current of about 75 A, speed of about 37.5 inch per minute, torch tip height of about 0.6 inch, and lateral offset of about 0.11 inch.

As another example, to produce a ¾-inch U-bevel profile at the edge of a part, a four-pass processing operation can be used to cut/remove materials to achieve this profile. During the first pass, a steel workpiece is completely cut/severed to generate the desired part. Parameters associated with this initial cut include an operating current of about 105 A, a torch height of about 0.1 inch, and a cut speed of about 33 inch per minute. During the subsequent three passes, one or more operating parameters are successively adjusted to shape the part into the desired profile. For instance, for the subsequent three passes, the operating current can remain at about 105 A, the torch height can be set to about 0.6 inch, and the torch speed can be set to about 20 inch per minute. In addition, for the subsequent three passes, the lateral offset of the torch head can be successively increased for every pass from about 0.1 inch during the second pass, to about 0.15 inch during the third pass, and then to about 0.2 inch for the fourth pass.

Figure 9:
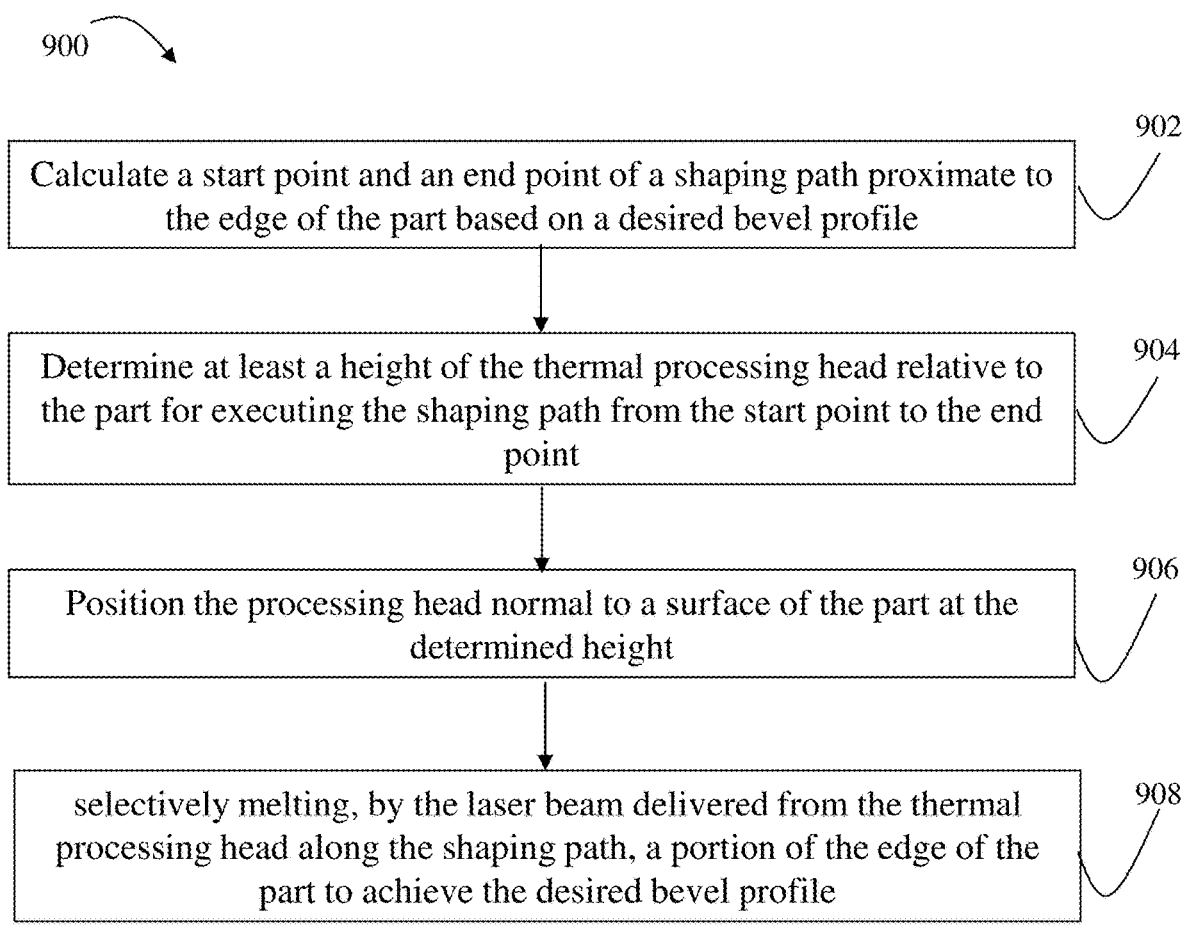
FIG. 9 shows an exemplary computerized process, adapted from the computerized process of FIG. 2, for shaping an edge of a part to be cut from a workpiece using a laser cutting system, according to some embodiments of the invention.

FIG. 9 shows an exemplary computerized process 900, adapted from the computerized process 200 of FIG. 2, for shaping an edge of a part to be cut from a workpiece 106 using a laser cutting system 100, according to some embodiments of the invention. Similar to a plasma arc torch system, the laser cutting system 100 can shape an edge of a part cut from a workpiece 106 to achieve a user desired profile, such as a beveled edge profile, a scooped edge profile or a chamfered edge profile.

As shown in FIG. 9, the process 900 starts at step 902 with the laser cutting system 100 (e.g., the processor 108 and/or the power supply 116 of the laser cutting system 100) calculating a start point and an end point of a shaping path proximate to the edge of the part to achieve a desired edge profile. In some embodiments, the shaping path includes multiple passes (e.g., two passes), with each pass extending between the start point and the end point. During the first pass, the laser cutting head 102 delivers a laser beam to pierce the workpiece 106 to detach at least a portion of the part from the workpiece 106 (e.g., cut away the part from the workpiece). After the first pass, the edge of the part at which the cut was made may be substantially right angled (i.e., 90 degrees). During the second and any subsequent pass, a laser beam is delivered to shape the edge of the part at which the initial cut was made such that the desired edge profile is achieved. In alternative embodiments, the part is provided without any additional cutting required, in which the case the shaping path is a single-pass operation where the start point and the end point of the shaping path indicate the edge at which shaping to the desired profile is needed.

At step 904, the laser cutting system 100 (e.g., the processor 108 and/or the power supply 116 of the laser cutting system 100) determines at least one of a height of the laser cutting head 102 relative to the surface of the part, lateral offset of the laser cutting head 102 from the edge of the part, speed of the laser cutting head 102, gas pressure/gas mixture, or laser power density when executing the shaping path from the start point to the end point, either in a multi-pass shaping path or a single-pass shaping path. For example, during the first pass, the height for setting the laser cutting head 102 is determined to generate a laser beam that penetrates through the workpiece to cut off the part from the workpiece 106, thereby dimensionally forming the edge of the part (e.g., as a right-angled edge). During the second or any subsequent pass (or in a single-pass shaping operation when cutting is not required), the height for setting the laser cutting head 102 is determined to generate a laser beam that selectively melts a top portion of the edge of the part, thereby achieving a beveled, chamfered or scooped edge profile. In some embodiments, in a two-pass operation, the height of the laser cutting head 102 relative to the part during the first pass is less than the height of the laser cutting head 102 relative to the part during the second pass, thereby decreasing the energy density of the laser beam impingement during the second pass. In some embodiments, in a multi-pass operation, other operating parameters associated with the laser cutting system 100 are also adjusted to achieve the desired edge profile for the part. For example, the second or any subsequent pass can introduce a lateral offset at which the laser beam impinges on the part in comparison to the location of impingement of the processing stream in the first pass. This lateral offset of the laser beam can be at least about 0.1 inch from the edge of the part. In some embodiments, the set of operating parameters, including the height of the laser cutting head 102, is determined based on at least one of a material type or a thickness of the workpiece.

At step 906, the laser cutting system 100 positions the laser cutting head 102 normal to the surface of the workpiece 106 at the height determined from step 904. At step 908, the laser cutting system 100 controllably delivers a laser beam via the laser cutting head 102 to selectively melt a portion of the edge of the part to achieve the desired profile at the edge of the part. The laser beam can be delivered by the laser cutting system 100 in either a multi-pass (e.g., two-pass) shaping path or a single-pass shaping path from the start point to the end point as described above. The laser cutting system 100 can generate the laser beams for the multi-pass shaping path or the single-pass shaping path using the operation parameter(s) determined for the respective pass(es) to achieve the desired edge profile. In some embodiments, for both the cutting and shaping operations, the distal tip of the laser beam as it penetrates the workpiece is substantially normal to the surface of the workpiece. That is, even during the second pass where no detachable cutting is required and the laser beam is used instead to shape the edge of the part, the laser beam does not bend but is substantially normal when penetrating the part. In some embodiments, while the laser beam remains straight (i.e., normal to the workpiece surface), the gases emitted from the laser cutting head curve about the edge of the part and flow laterally out and then down off the part about the edge of the part, thereby shaping the edge as desired. In some embodiments, in addition to the cutting head height, other operating parameters are suitably adjusted to achieve the desired edge profile, such as the gas pressure associated with the laser beam. In general, the higher the pressure used, the more material is blown away during edge processing.

In some embodiments, a similar approach described above with respect to the plasma and laser cutting systems is utilized by a liquid jet system for shaping the edge of a part. For example, a multi-pass process can be used by a waterjet processing system to first cut a part from a desired workpiece and then shape the edge of the part during the subsequent pass(es). In some embodiments, the desired shaping can be achieved during the subsequent pass(es) by varying one or more operating parameters of the waterjet processing system, including the speed, torch head height, lateral offset of the torch head relative to the part edge, garnet size, type or amount, and waterjet pressure.

As described herein, the systems and methods of the present invention are capable of producing sloped cuts (e.g., beveled, rounded or chamfered cuts) on workpieces with consistent angles and results. These cuts can be efficiently produced using simple process settings and low-cost equipment (e.g., simple X-Y tables and typical consumables) with minimal secondary machining/work involved. In contrast, complex robotics and/or specialized equipment were previously needed to produce the same angled cuts. Thus, the present invention provides an automated, efficient and low-cost solution for generating specific part edge profiles, thereby reducing the need for end users to purchase and maintain expensive 3D cutting solutions. For example, the present invention can produce weld-ready (e.g., beveled) and/or paint-ready (e.g., chamfered or rounded) workpieces using just a straight torch plasma cutting system (e.g., no need for bevel head nor table) and a simple XY table.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computer-implemented method for shaping an edge of a part to be cut from a workpiece using a plasma arc torch system comprising a processing head configured to deliver a plasma arc, the method comprising:
    calculating, by the plasma arc torch system, a start point and an end point of a shaping path proximate to the edge of the part based on a desired edge profile;
    determining, by the plasma arc torch system, a set of operating parameters to controllably impinge the plasma arc about the edge of the part to execute the shaping path from the start point to the end point, wherein the set of operating parameters includes at least one of a height of the processing head relative to the part, an energy density of the plasma arc, a speed of the processing head along the shaping path, an offset of the shaping path relative to the edge of the part, and a pressure of the plasma arc;
    positioning, by the plasma arc torch system, the processing head normal to a surface of the part; and
    controllably bending the plasma arc at the edge of the part, by the processing head, to shape the desired edge profile.

2. The computer-implemented method of claim 1, wherein the desired edge profile comprises one of a beveled edge, a scooped edge or a chamfered edge.

3. The computer-implemented method of claim 1, wherein the controllably bending of the plasma arc comprises bending a distal tip of the plasma arc in a direction non-normal to a direction of travel of the processing head across the workpiece.

4. The computer-implemented method of claim 3, wherein the distal tip of the plasma arc comprises about 40% of a length of the plasma arc.

5. The computer-implemented method of claim 1, wherein the height of the processing head relative to the part for shaping the edge of the part is set to enable generation of an energy density of about 25% of an energy density of a plasma arc usable for cutting the part.

6. The computer-implemented method of claim 1, wherein the processing head is laterally offset from the edge of the part of the workpiece by at least about 10% of a width of the plasma arc.

7. The computer-implemented method of claim 1, wherein the shaping path is located within about 1 inch from the edge of the part of the workpiece.

8. The computer-implemented method of claim 1, wherein the shaping path comprises a first pass between the start point and the end point and a second pass between the start point and the end point, wherein (i) during the first pass the plasma arc pierces the workpiece to detach at least a portion of the part from the workpiece and (ii) during the second pass the plasma arc shapes the edge of the detached part to achieve the desired edge profile.

9. The computer-implemented method of claim 8, wherein at least one of the processing head height, energy density, pressure, gas mixture, speed or offset is different between the first pass and the second pass to achieve the desired edge profile.

10. The computer-implemented method of claim 8, wherein the height of the processing head relative to the part during the first pass is less than the height of the processing head relative to the part during the second pass, thereby decreasing the energy density of the plasma arc impinging on the workpiece during the second pass.

11. The computer-implemented method of claim 8, further comprising producing a desired angle and depth associated with the desired edge profile by controlling a speed of the processing head during the second pass.

12. The computer-implemented method of claim 8, further comprising installing a set of cutting consumables to perform the first pass and installing a different set of consumables to perform the second pass.

13. The computer-implemented method of claim 1, wherein determining the set of operating parameters is based on at least one of a material type or a thickness of the workpiece.

14. The computer-implemented method of claim 8, further comprising employing one set of consumables for both the first and second passes and varying one or more of the operating parameters between the first and second passes to controllably shape the edge of the part.

* * * * *